US010225780B2

(12) United States Patent
Chen (10) Patent No.: US 10,225,780 B2
(45) Date of Patent: Mar. 5, 2019

(54) DEVICE AND METHOD OF HANDLING RADIO RESOURCE CONTROL CONNECTION RESUME PROCEDURE

(71) Applicant: HTC Corporation, Taoyuan (TW)

(72) Inventor: Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/609,044

(22) Filed: May 31, 2017

(65) Prior Publication Data

US 2017/0353902 A1    Dec. 7, 2017

Related U.S. Application Data (60) Provisional application No. 62/343,868, filed on Jun. 1, 2016.

(51) Int. Cl.
| | |
|---|---|
| *H04W 36/00* | (2009.01) |
| *H04W 36/08* | (2009.01) |
| *H04W 36/18* | (2009.01) |
| *H04W 76/11* | (2018.01) |
| *H04W 76/18* | (2018.01) |
| *H04W 76/20* | (2018.01) |
| *H04W 76/27* | (2018.01) |
| *H04W 48/20* | (2009.01) |

(52) U.S. Cl.
CPC ....... *H04W 36/18* (2013.01); *H04W 36/0055* (2013.01); *H04W 36/08* (2013.01); *H04W 76/11* (2018.02); *H04W 76/18* (2018.02); *H04W 76/20* (2018.02); *H04W 76/27* (2018.02); *H04W 48/20* (2013.01)

(58) Field of Classification Search
CPC ..... H04W 36/18; H04W 76/20; H04W 76/18; H04W 76/11; H04W 76/27; H04W 36/0055; H04W 36/08
See application file for complete search history.

(56) References Cited

U.S. PATENT DOCUMENTS

| | | | |
|---|---|---|---|
| 2013/0260810 A1* | 10/2013 | Rayavarapu | H04W 76/19 455/509 |
| 2017/0332431 A1* | 11/2017 | Kim | H04W 76/028 |

OTHER PUBLICATIONS

Search Report dated Nov. 23, 2017 for EP application No. 17173629.1, pp. 1-9.
ZTE, "AS-NAS interaction for failure to resume the RRC connection", 3GPP TSG-RAN WG2 Meeting #94, R2-163641, May 23-27, 2016, Nanjing, China, XP051112323, pp. 1-4.

(Continued)

Primary Examiner — Marisol Figueroa
(74) Attorney, Agent, or Firm — Winston Hsu (57) ABSTRACT

A method of handling a RRC connection resume procedure between a NAS layer and a RRC layer of a communication device, comprising the RRC layer entering a RRC idle mode and camping on a first cell of a network; the NAS layer in a NAS idle mode with suspend indication transmitting a first request message to the RRC layer to resume a RRC connection; the RRC layer starting a timer and transmitting a first RRC connection resume request message to the network, after receiving the first request message from the NAS layer; the RRC layer reselecting a second cell of the network, when the timer is running; and the RRC layer informing the NAS layer a failure of resuming the RRC connection with a first suspend indication.

12 Claims, 5 Drawing Sheets

(56) References Cited

OTHER PUBLICATIONS

Ericsson, "RRC Resume AS-NAS interaction", 3GPP TSG-RAN WG2 #93bis, Tdoc R2-162865, Apr. 11-15, 2016, Dubrovnik, Croatia, XP051082605, pp. 1-6.
LG Electronics, "UE internal NAS-AS interaction to perform RRC Connection Resume Procedure", 3GPP TSG CT WG1 Meeting #97, C1-161884, Apr. 11-15, 2016, Ljubljana (Slovenia), XP051078741, pp. 1-5.
3GPP TSG-RAN WG2 Meeting#94 R2-164516, May 23, 2016.
3GPP TS 36.331 V13.1.0, Mar. 2016.
3GPP TS 24.301 V13.5.0, Mar. 2016.
3GPP TSG-RAN WG2 Meeting #94 R2-16XXXX Change Request 36.331 CR 2210 rev 2 Current version: 13.1.0, May 2016.
Intel Corporation, "Benefits of Light connection over Suspend-Resume procedure", 3GPP TSG RAN WG2 Meeting #94, R2-163631, Nanjing, China, May 23-27, 2016, pp. 1-8.
CATT, "EMM Procedure initiation after the suspend of NAS signalling connection", 3GPP TSG-CT WG1 Meeting #97, C1-161601, Ljubljana (Slovenia), Apr. 11-15, 2016, pp. 1-3.
Office action dated May 8, 2018 for the Taiwan application No. 106118103, filing date Jun. 1, 2017, pp. 1-10.

\* cited by examiner

DEVICE AND METHOD OF HANDLING RADIO RESOURCE CONTROL CONNECTION RESUME PROCEDURE

CROSS REFERENCE TO RELATED APPLICATIONS

This application claims the benefit of U.S. Provisional Application No. 62/343,868, filed on Jun. 1, 2016, which is incorporated herein by reference.

BACKGROUND OF THE INVENTION

1. Field of the Invention

The present invention relates to a communication device and a method used in a wireless communication system, and more particularly, to a communication device and method of handling a radio resource control (RRC) connection resume procedure.

2. Description of the Prior Art

When a cell re-selection occurs during a radio resource control (RRC) connection resume procedure, a RRC layer of a user equipment (UE) may stop the RRC connection resume procedure. However, the RRC layer may only inform a NAS layer of the UE that the RRC connection is established unsuccessfully, after the RRC connection resume procedure is stopped. Thus, the NAS layer may consider it as a resume failure and regard the corresponding resume parameter as invalid. As a result, when the NAS layer wants to initiate another NAS procedure, the NAS layer would request the RRC layer to use a RRC connection establishment procedure rather than the RRC connection resume procedure as the resume parameter is regarded as invalid. However, the RRC connection establishment procedure is more inefficient than the RRC connection resume procedure. Thus, communication between the UE and the network cannot be performed efficiently.

Thus, how to handle the RRC connection resume procedure is an important problem to be solved.

SUMMARY OF THE INVENTION

The present invention therefore provides a method and related communication device for handling a radio resource control (RRC) connection resume procedure to solve the abovementioned problem.

A method of handling a radio resource control (RRC) connection resume procedure between a non-access stratum (NAS) layer and a RRC layer of a communication device, the method comprising the RRC layer entering a RRC idle mode and camping on a first cell of a network; the NAS layer in a NAS idle mode with suspend indication transmitting a first request message to the RRC layer to resume a RRC connection; the RRC layer starting a timer and transmitting a first RRC connection resume request message to the network, after receiving the first request message from the NAS layer; the RRC layer reselecting a second cell of the network, when the timer is running; and the RRC layer informing the NAS layer a failure of resuming the RRC connection with a first suspend indication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
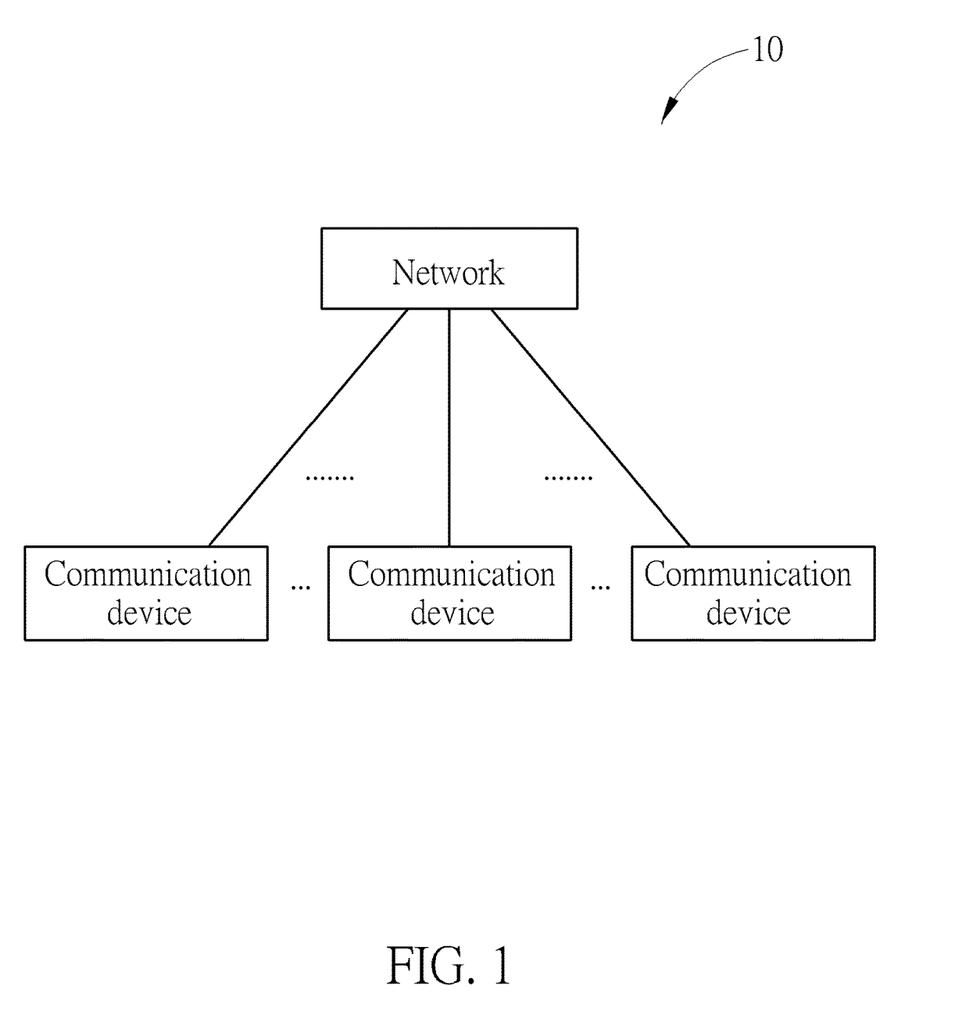
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-Bs (NB) in a universal mobile telecommunications system (UMTS). Alternatively, the network may be an evolved UTRAN (E-UTRAN) including at least one evolved NB (eNB) and/or at least one relay in a long term evolution (LTE) system, a LTE-Advanced (LTE-A) system, an evolution of the LTE-A system, or a fifth generation (5G) system. Further, the network may also include both the UTRAN/E-UTRAN and a core network, wherein the core network includes network entities such as a mobility management entity (MME), a serving gateway (S-GW), a packet data network (PDN) gateway (P-GW), a self-organizing networks (SON) server and/or a radio network controller (RNC), etc.

The communication device may be a user equipment (UE), a mobile phone, a laptop, a tablet computer, an electronic book, a portable computer system, a vehicle or an aircraft. In addition, the network and the communication device can be seen as a transmitter or a receiver according to transmission direction, e.g., for a uplink (UL), the communication device is the transmitter and the network is the receiver, and for a downlink (DL), the network is the transmitter and the communication device is the receiver.

Figure 2:
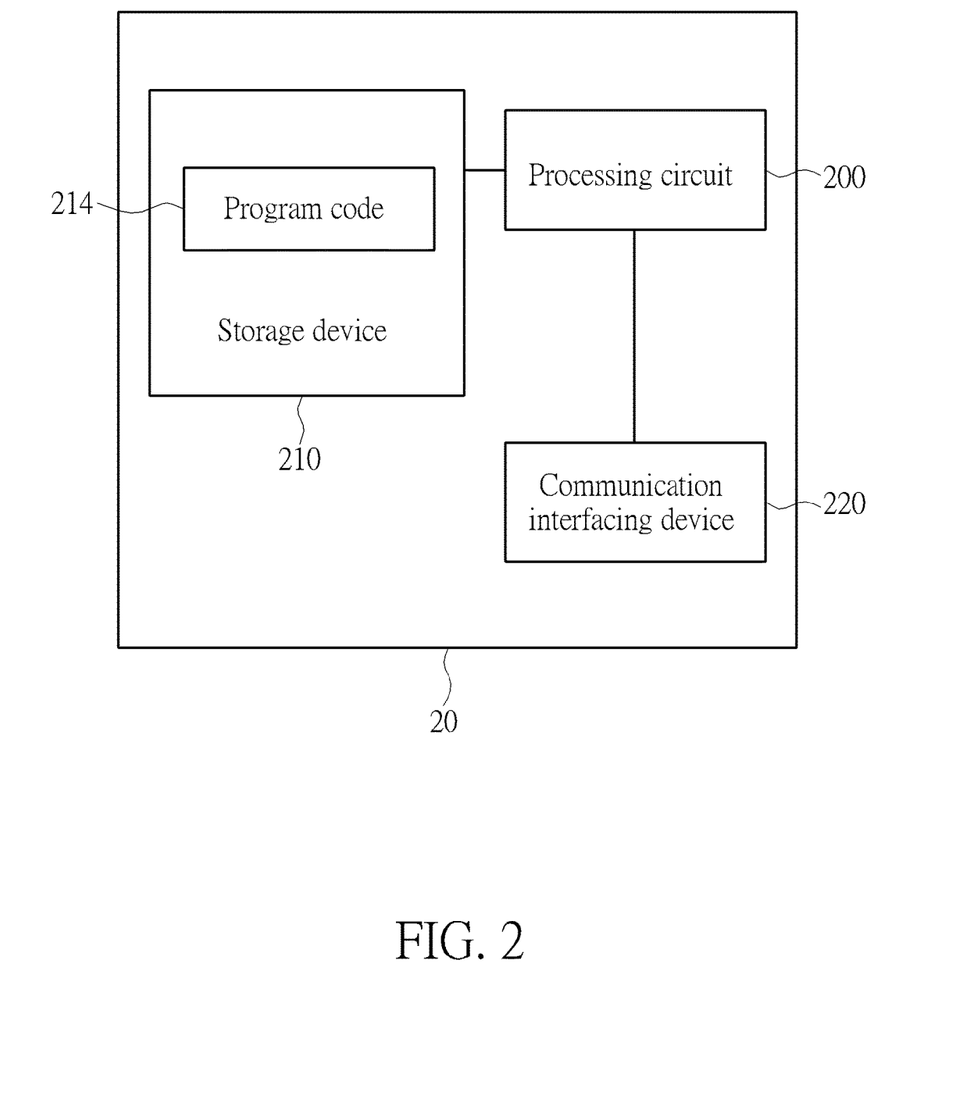
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that stores a program code 214, accessed and executed by the processing circuit 200. Examples of the storage device 210 include but are not limited to a read-only memory (ROM), flash memory, random-access memory (RAM), hard disk, optical data storage device, non-volatile storage device, non-transitory computer-readable medium (e.g., tangible media), etc. The communication interfacing device 220 is preferably a transceiver used to transmit and receive signals (e.g., data, signals, messages and/or packets) according to processing results of the processing circuit 200.

In the following diagrams and embodiments, a UE is used for representing the communication device in FIG. 1, to simplify the illustration of the embodiments.

Figure 3:
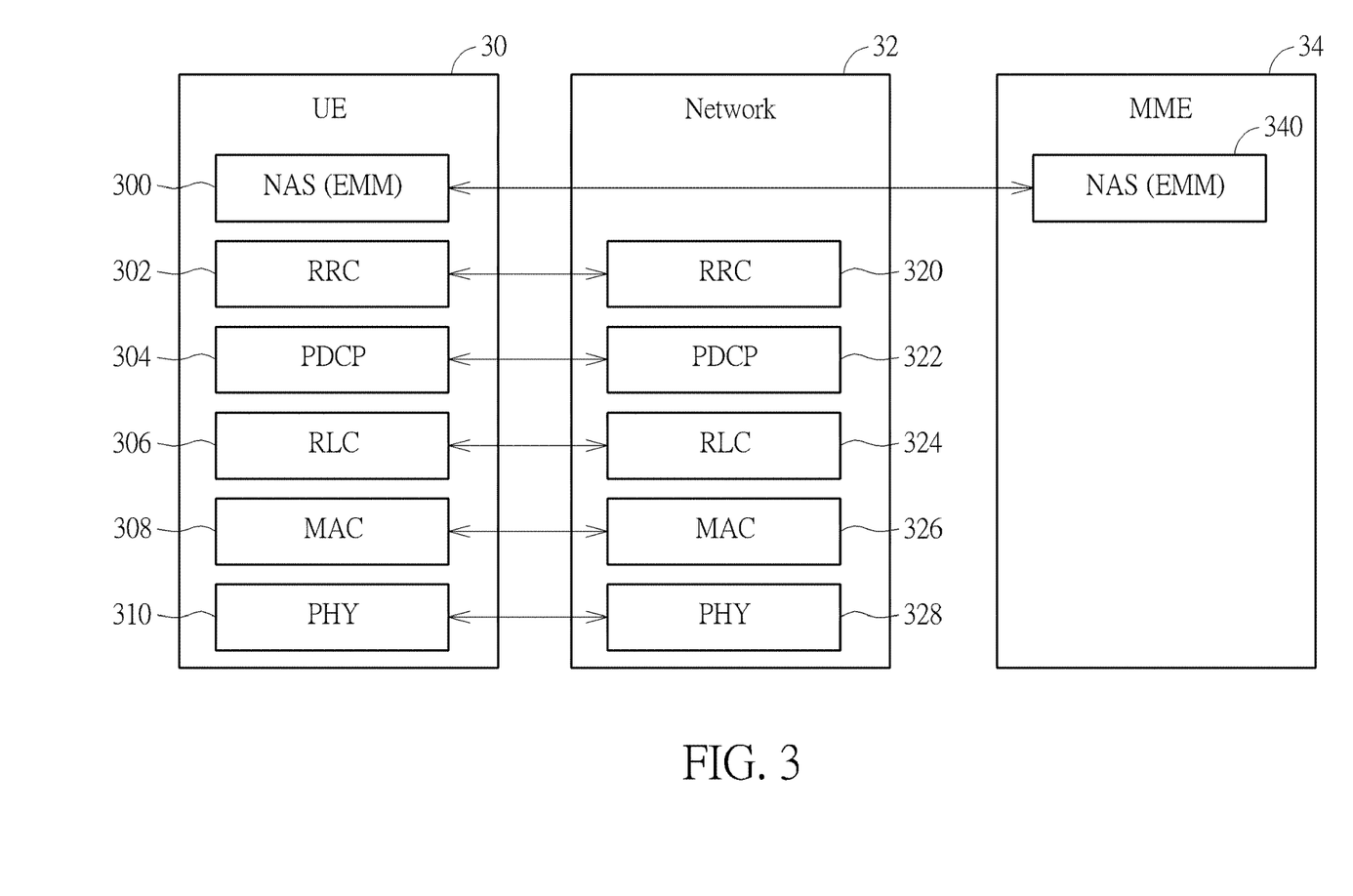
FIG. 3 is a schematic diagram of a protocol stack in a control plane according to an example of the present invention.

FIG. 3 is a schematic diagram of a protocol stack in a control plane according to an example of the present invention. There are 6 protocol layers which include a non-access stratum (NAS) layer 300, a radio resource control (RRC) layer 302, a packet data convergence control (PDCP) layer 304, a radio link control (RLC) layer 306, a medium access (MAC) layer 308 and a physical (PHY) layer 310 in a UE 30 (e.g., the communication device in FIG. 1). In detail, a component of evolved packet system (EPS) mobility management (EMM) may be included in the NAS layer of the UE. Further, there are 5 protocol layers which include a RRC layer 320, a PDCP layer 322, a RLC layer 324, a MAC layer 326 and a PHY layer 328 in a network 32 (e.g., the network in FIG. 1). There is one protocol layer which includes a NAS layer 340 in a MME 34. In addition, there are 2 modes (e.g., states), e.g., an EMM_IDLE mode and an EMM_CONNECTED mode, corresponding to the NAS layer of the UE. There are 2 modes, e.g., an EMM_IDLE mode with suspend indication and an EMM_IDLE mode without suspend indication corresponding to the EMM_IDLE mode. There are 2 modes, e.g., a RRC_IDLE mode and a RRC_CONNECTED mode corresponding to the RRC layer of the UE. In general, the NAS layer of the UE 300 may request the RRC layer of the UE 302 to establish or resume a RRC connection, when the NAS layer of the UE 300 intends to initiate a NAS procedure, e.g., transmit a NAS protocol data unit (PDU) to the NAS layer of the MME 340 when the UE 30 is in an idle mode. The RRC layer of the UE 302 may enter the RRC_CONNECTED mode, when there is a RRC connection between the UE 30 and the network 32. The NAS layer of the UE 300 may enter the EMM_CONNECTED mode, when there is a NAS signaling connection between the UE 30 and the MME 34.

Figure 4:
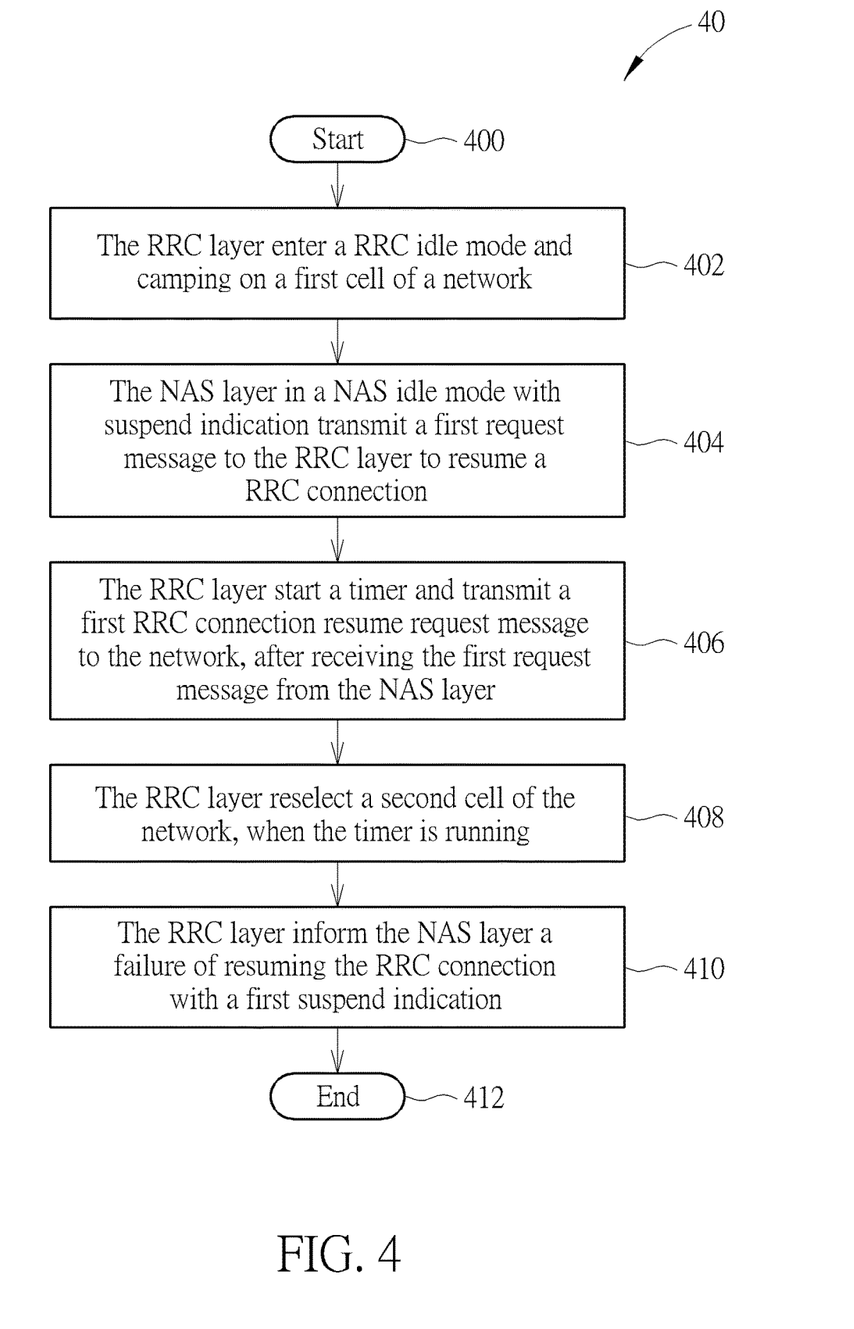
FIG. 4 is a flowchart of a process according to an example of the present invention.

FIG. 4 is a flowchart of a process 40 according to an example of the present invention. The process 40 may be utilized in a NAS layer (e.g., the NAS layer of the UE in FIG. 3) and a RRC layer (e.g., the RRC layer of the UE in FIG. 3) of a UE (e.g., the communication device in FIG. 1). The process 40 includes the following steps:

Step 400: Start.

Step 402: The RRC layer enter a RRC idle mode and camping on a first cell of a network.

Step 404: The NAS layer in a NAS idle mode with suspend indication transmit a first request message to the RRC layer to resume a RRC connection.

Step 406: The RRC layer start a timer and transmit a first RRC connection resume request message to the network, after receiving the first request message from the NAS layer.

Step 408: The RRC layer reselect a second cell of the network, when the timer is running.

Step 410: The RRC layer inform the NAS layer a failure of resuming the RRC connection with a first suspend indication.

Step 412: End.

According to the process 40, the RRC layer may enter a RRC idle mode (e.g., RRC_IDLE mode) and camping on a first cell of a network (e.g., the network in FIG. 1). The NAS layer in a NAS idle mode with suspend indication (e.g., EMM_IDLE mode with suspend indication) may transmit a first request message to the RRC layer to resume a RRC connection, e.g., due to initiating a NAS procedure. Then, the RRC layer may start a timer and may transmit a first RRC connection resume request message to the network, after receiving the first request message from the NAS layer. Further, the RRC layer may reselect a second cell of the network, when the timer is running. The RRC layer may inform the NAS layer a failure of resuming the RRC connection with a first suspend indication. That is, the RRC layer informs the NAS layer that the RRC connection is resumed unsuccessfully rather than the RRC connection is established unsuccessfully, after the second cell is reselected. Accordingly, the NAS layer is able to perform the RRC connection resume procedure, when the NAS layer intends to initiate another NAS procedure. Thus, communication between the UE and the network can be performed efficiently.

Realization of the process 40 is not limited to the above description. The following examples may be applied for realizing the process 40.

In one example, the steps of the process 40 further include (e.g., before Step 402): the UE in a RRC connected mode (e.g., RRC_CONNECTED mode) may receive a RRC connection release message including an identity parameter and a release cause from the network. Then, the RRC layer may store the identity parameter and an access stratum (AS) context of the UE and may inform the NAS layer that the RRC connection is suspended, after receiving the RRC connection release message from the network. Further, the RRC layer may enter the RRC idle mode (e.g., RRC_IDLE mode) and may camp on the first cell. The NAS layer may enter the NAS idle mode with suspend indication, after being informed that the RRC connection is suspended.

In one example, the RRC layer may not release the identity parameter and the AS context of the UE, after reselecting the second cell.

In one example, the release cause may include a "rrcSuspend" indicating that the RRC connection is suspended. In one example, the step of the RRC layer camping on the first cell may include that the RRC layer receives system information (e.g., system information block (SIB)) from the first cell.

In one example, the NAS layer may include the component of the EMM. It should be noted that, the NAS layer in the process 40 may be referred to the component of the EMM included in the NAS layer.

That is, operations related to the process 40 performed by the NAS layer may be performed by the component of the EMM in the NAS layer.

In one example, the timer may be a "T300" timer. In one example, the identity parameter may include a "resumeIdentity". In one example, the step of the RRC layer reselecting the second cell may include that the RRC layer receives another system information (e.g., SIB) from the second cell. That is, the RRC layer may reselect the second cell by receiving the system information.

In one example, the NAS layer may enter the NAS idle mode with suspend indication, after receiving the first suspend indication from the RRC layer. In one example, the NAS layer in the NAS idle mode with suspend indication may transmit a second request message to the RRC layer to resume the RRC connection, after entering the NAS idle mode with suspend indication. In one example, the RRC layer may start the timer and may transmit a second RRC connection resume request message to the network, after receiving the second request message from the NAS layer.

In one example, when the NAS layer in the NAS idle mode with suspend indication wants to transmit a NAS message to the network, the NAS layer may request the RRC layer to resume the RRC connection. In one example, the NAS message may include an "ATTACH REQUEST" message, a "DETACH REQUEST" message, a "TRACKING AREA UPDATE REQUEST" message, a "SERVICE REQUEST" message or an "EXTENDED SERVICE REQUEST" message.

In one example, the NAS layer may transmit a third request message for releasing the identity parameter and the AS context to the RRC layer, after receiving the first suspend indication from the RRC layer.

Figure 5:
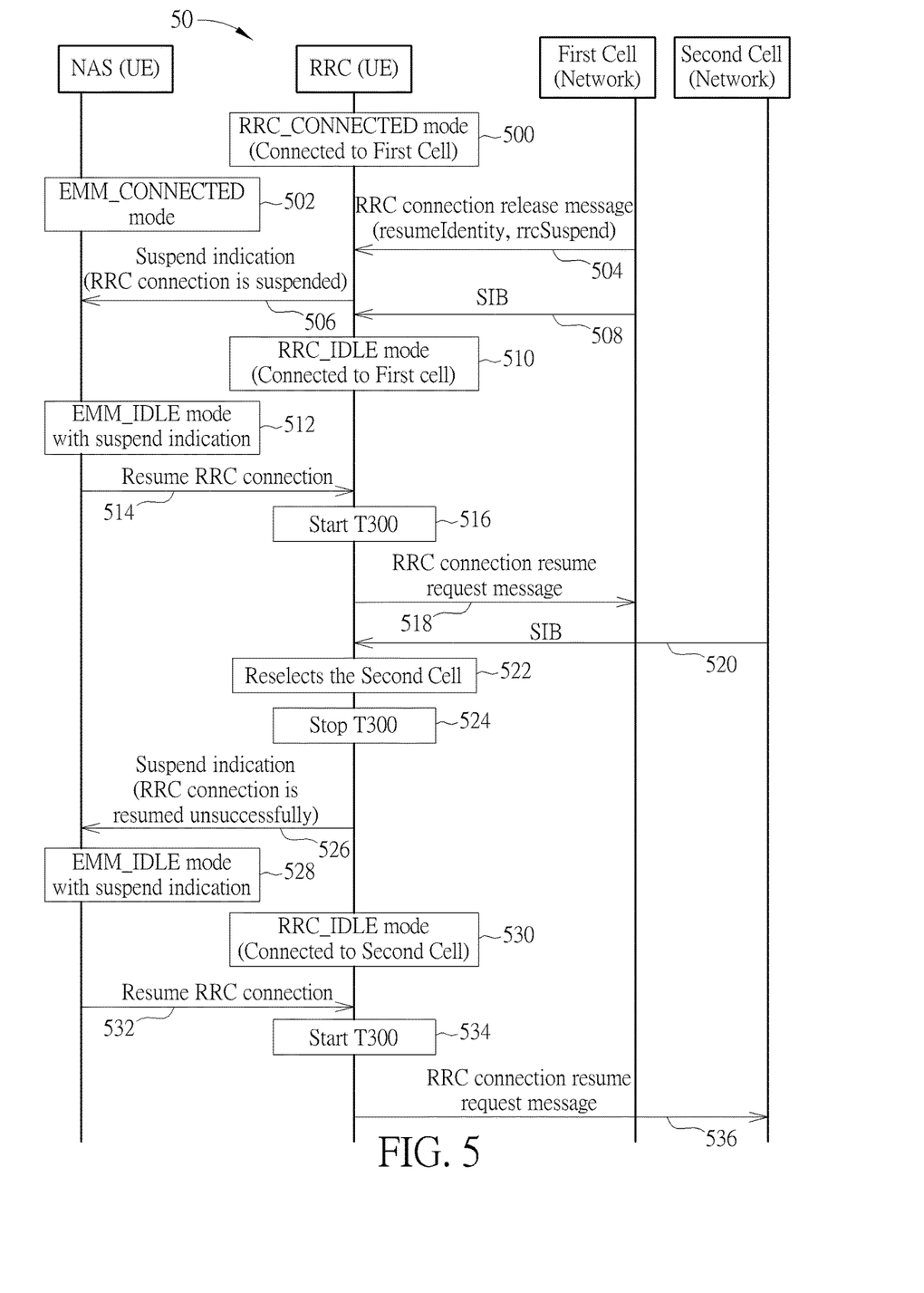
FIG. 5 is a flow diagram of a RRC connection resume procedure according to an example of the present invention.

FIG. 5 is a flow diagram of a RRC connection resume procedure 50 according to an example of the present invention. At an event 500, the RRC layer of the UE is in a RRC_CONNECTED mode, and is connected to a first cell of the network. At an event 502, the NAS layer of the UE is in an EMM_CONNECTED mode. At an event 504, the RRC layer receives a RRC connection release message including a "resumeIdentity" and a "rrcSuspend" from the first cell. At an event 506, the RRC layer stores the "resumeIdentity" and an AS context of the UE, and transmits a suspend indication for informing the NAS layer in the EMM_CONNECTED mode that the RRC connection is suspended to the NAS layer. At an event 508, the RRC layer receives a SIB from the first cell. At an event 510, the RRC layer enters a RRC_IDLE mode. At an event 512, the NAS layer enters an EMM_IDLE mode with suspend indication. At an event 514, the NAS layer in the EMM_IDLE mode with suspend indication transmits a request message for resuming a RRC connection to the RRC layer. At an event 516, the RRC layer starts a "T300" timer. At an event 518, the RRC layer transmits a RRC connection resume request message to the first cell. At an event 520, the RRC layer receives another SIB from a second cell of the network. At an event 522, the RRC layer reselects the second cell, when the "T300" timer is running. At an event 524, the RRC layer stops the "T300" timer. At an event 526, the RRC layer does not release the "resumeIdentity" and the AS context, and transmits another suspend indication for informing the NAS layer that the RRC connection is resumed unsuccessfully to the NAS layer. At an event 528, the NAS layer enters the EMM_IDLE mode with suspend indication. At an event 530, the RRC layer enters the RRC_IDLE mode. At an event 532, the NAS layer in the EMM_IDLE mode with suspend indication transmits another request message for resuming the RRC connection to the RRC layer. At an event 534, the RRC layer starts the "T300" timer. At an event 536, the RRC layer transmits another RRC connection resume request message to the second cell.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling a RRC connection resume procedure. Accordingly, a RRC layer of a UE informs a NAS layer of the UE that the RRC connection is resumed unsuccessfully, after a cell re-selection occurs during the RRC connection resume procedure. Thus, the NAS layer is able to perform the RRC connection resume procedure, when the NAS layer intends to initiate another NAS procedure. As a result, communication between the UE and the network can be performed efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a radio resource control (RRC) connection resume procedure between a non-access stratum (NAS) layer and a RRC layer of a communication device, the method comprising:
   the RRC layer entering a RRC idle mode and camping on a first cell of a network;
   the NAS layer in a NAS idle mode with suspend indication transmitting a first request message to the RRC layer to resume a RRC connection;
   the RRC layer starting a "T300" timer and transmitting a first RRC connection resume request message to the network, after receiving the first request message from the NAS layer; and
   when the "T300" timer is running and the RRC layer is reselecting a second cell of the network, the RRC layer informing the NAS layer a failure of resuming the RRC connection with a first suspend indication.

2. The method of claim 1, further comprises:
   the communication device in a RRC connected mode receiving a RRC connection release message comprising an identity parameter and a release cause from the network;
   the RRC layer storing the identity parameter and an access stratum (AS) context of the communication device and informing the NAS layer that the RRC connection is suspended, after receiving the RRC connection release message from the network;
   the RRC layer entering the RRC idle mode and camping on the first cell; and
   the NAS layer entering the NAS idle mode with suspend indication, after being informed that the RRC connection is suspended.

3. The method of claim 2 further comprises:
   the RRC layer not releasing the identity parameter and the AS context of the communication device, after reselecting the second cell.

4. The method of claim 2, wherein the release cause comprises a "rrcSuspend" indicating that the RRC connection is suspended.

5. The method of claim 1, wherein the NAS layer comprises a component of an evolved packet system (EPS) mobility management (EMM).

6. The method of claim 1, wherein the identity parameter comprises a "resumeIdentity".

7. The method of claim 1, further comprising:
   the NAS layer entering the NAS idle mode with suspend indication, after receiving the first suspend indication from the RRC layer.

8. The method of claim 7, further comprising:
   the NAS layer in the NAS idle mode with suspend indication transmitting a second request message to the RRC layer to resume the RRC connection, after entering the NAS idle mode with suspend indication.

9. The method of claim 8, further comprising:
the RRC layer starting the "T300" timer and transmitting a second RRC connection resume request message to the network, after receiving the second request message from the NAS layer.

10. The method of claim 1, wherein when the NAS layer in the NAS idle mode with suspend indication wants to transmit a NAS message to the network, the NAS layer requests the RRC layer to resume the RRC connection.

11. The method of claim 10, wherein the NAS message comprises an "ATTACH REQUEST" message, a "DETACH REQUEST" message, a "TRACKING AREA UPDATE REQUEST" message, a "SERVICE REQUEST" message or an "EXTENDED SERVICE REQUEST" message.

12. The method of claim 1, further comprising:
the NAS layer transmitting a third request message for releasing the identity parameter and the AS context to the RRC layer, after receiving the first suspend indication from the RRC layer.

* * * * *